United States Patent [19]

Shimanuki et al.

[11] Patent Number: 4,797,825
[45] Date of Patent: Jan. 10, 1989

[54] ANTI-SKID CONTROL SYSTEM FOR MOTOR VEHICLES

[75] Inventors: Haruki Shimanuki, Kasukabe; Katsuya Miyake, Ageo; Hideo Akima, Yokohama; Akira Hoashi, Munakata, all of Japan

[73] Assignees: Akebono Brake Industry Co., Ltd., Tokyo; Fujitsu Limited, Kawasaki, both of Japan

[21] Appl. No.: 946,824

[22] Filed: Dec. 29, 1986

[30] Foreign Application Priority Data

Dec. 27, 1985 [JP] Japan .................... 60-292994

[51] Int. Cl.$^4$ .................................. B60T 8/58
[52] U.S. Cl. ..................... 364/426.02; 303/96; 303/103
[58] Field of Search ........... 364/565, 426; 180/197; 303/94–96, 102, 103, 109, 113

[56] References Cited

U.S. PATENT DOCUMENTS

| | | | |
|---|---|---|---|
| 4,320,460 | 3/1982 | Brearley et al. | 364/426 |
| 4,485,445 | 11/1984 | Braschel | 364/426 |
| 4,489,382 | 12/1984 | Jonner et al. | 303/96 |
| 4,530,059 | 7/1985 | Brearley et al. | 364/426 |
| 4,637,663 | 1/1987 | Matsuda | 364/426 |
| 4,665,490 | 5/1987 | Masaki et al. | 364/426 |
| 4,666,218 | 5/1987 | Masaki et al. | 364/426 |

Primary Examiner—Gary Chin

[57] ABSTRACT

An anti-skid control system for motor vehicles is provided wherein when the time period from when the wheel velocity being decreased reaches a second reference velocity to a low peak of the wheel velocity at which the reduction of the brake pressure is to be stopped, is longer than a predetermined time period, the reduction of the brake pressure is continued until the wheel velocity is increased up to a first reference velocity which is higher than the second reference velocity. In this way, even if the wheel velocity drops sharply because the coefficient of friction of the road surface suddenly changes from high to low, the wheel velocity recovers so that the wheels of the motor vehicle are prevented from locking early.

4 Claims, 4 Drawing Sheets

ANTI-SKID CONTROL SYSTEM FOR MOTOR VEHICLES

BACKGROUND OF THE INVENTION

1. Field of the Invention

This invention relates to a system for preventing the wheels of a motor vehicle from skidding when braked, and more particularly it pertains to an anti-skid control system for motor vehicles, which is so designed as to be able to most effectively cope with a situation where the coefficient of friction of the road surface suddenly changes from high to low during anti-skid control operation.

2. Description of the Prior Art

Generally, with an anti-skid system for motor vehicles, hold valves and decay valves comprising electromagnetic valves are opened and closed on the basis of electrical signals representing wheel velocities sensed by means of wheel velocity sensors, thereby increasing, holding or reducing the brake pressure, for the purpose of securing improved steering performance and running stability of the motor vehicle during braking operation, while at the same time shortening the braking distance.

FIG. 1 of the accompanying drawings illustrates, by way of example, manners in which wheel velocity Vw and brake pressure Pw are varied during the operation of a conventional anti-skid control system, together with a hold signal HS and a decay signal DS for opening and closing hold valves and decay valves, respectively.

When the brake apparatus of a running motor vehicle is not operated, the hold valves remain open while the decay valves remain closed, and the brake pressure Pw is not increased. When the brake apparatus is operated, the brake pressure Pw is increased so that the wheel velocity Vw is decreased. As the wheel velocity Vw is being decreased, and when the deceleration (negative acceleration) of the wheel reaches a predetermined level, the hold signal HS is generated, whereby the hold valves are closed so that the brake pressure Pw is held constant; and at a point of time when the wheel velocity becomes equal to a reference wheel velocity Vt which is set up to follow the wheel velocity Vw with a predetermined relationship thereto, i.e., at time t1 when curves representing the wheel velocity Vw and reference when velocity Vt cross each other (see FIG. 1), the decay signal DS is generated, whereby the decay valves are opened so that reduction of the brake pressure is initiated. As a result of this reduction of the brake pressure Pw, the wheel velocity Vw is changed from decreasing to increasing, at time t2 when a low peak Vl of the wheel velocity Vw occurs. Either at the time t2, or at time t3 when the wheel velocity has been increased up to the level of a velocity Vb that is higher than the low peak by 15% of the difference A between the wheel velocity Va at the time t1 when the reduction of the brake pressure was started, and the low peak velocity Vl, the decay signal is interrupted so that the reduction of the brake pressure Pw is interrupted and thus the brake pressure Pw is held constant. At time t4 when the wheel velocity Vw reaches the level of a high peak velocity Vh, buildup of the brake pressure is again started. In this case, the buildup of the brake pressure is effected in such a manner that the brake pressure is alternately increased and held constant in succession due to the fact that the hold signal HS occurs mincingly, so that the brake pressure Pw gradually builds up; in this way, the wheel velocity Vw is decreased, and the mode for reduction of the brake pressure occurs again.

During the operation of the aforementioned conventional anti-skid control system, if the coefficient of friction of the road surface changes from high to low, i.e., if a so-called "high jump" road surface condition occurs, then the wheel velocity Vw will be reduced sharply; thus, with the above-described conventional arrangement wherein reduction of the brake pressure is simply stopped either at time t2 when a low peak of the wheel velocity Vw occurs or at time t3 when a 15% increase in the wheel velocity Vw from the low peak occurs, the wheel velocity Vw tends to be behind in its recovery so that one or more of the wheels tend to be subjected to early-locking.

SUMMARY OF THE INVENTION

Accordingly, it is an object of the present invention to provide a novel and improved anti-skid control system for motor vehicles, which is so designed that even if the wheel velocity is reduced sharply when the coefficient of friction of the road surface suddenly changes from high to low, i.e., when a so-called "high jump" road surface condition occurs, the wheel velocity is permitted to recover.

Briefly stated, according to the present invention, a computed vehicle velocity Vv is set up on the basis of the highest one of the wheel velocities of the motor vehicle (selection of the highest wheel velocity). A first reference velocity VT1 and a second reference velocity VT2 which are related to the computed vehicle velocity Vv either with predetermined speed differences or with predetermined ratios respectively are set up in such a manner that the first reference VT1 is higher than the second reference velocity VT2 (VT1>VT2). When the time period T from when the wheel velocity being decreased reaches the level of the second reference velocity VT2 to a low peak of the wheel velocity is longer than a predetermined time period T1, the reduction of the brake pressure is continued until the wheel velocity increases up to the level of the first reference velocity VT1, despite the occurrence of the low peak of the wheel velocity.

Other objects, features and advantages of the present invention will become apparent from the ensuing description taken in conjunction with the accompanying drawings.

DESCRIPTION OF THE PREFERRED EMBODIMENTS

Figure 1:
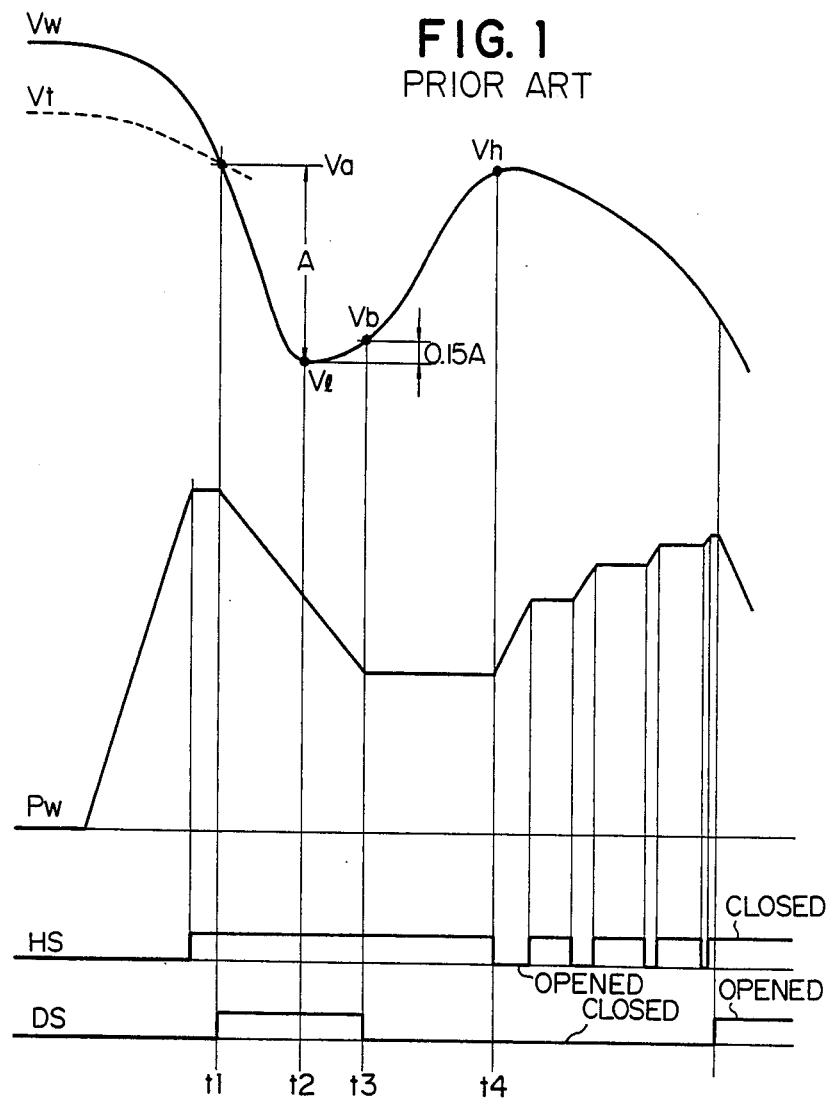
FIG. 1 is a view useful for explaining the operation of a conventional anti-skid control system.
Figure 2:
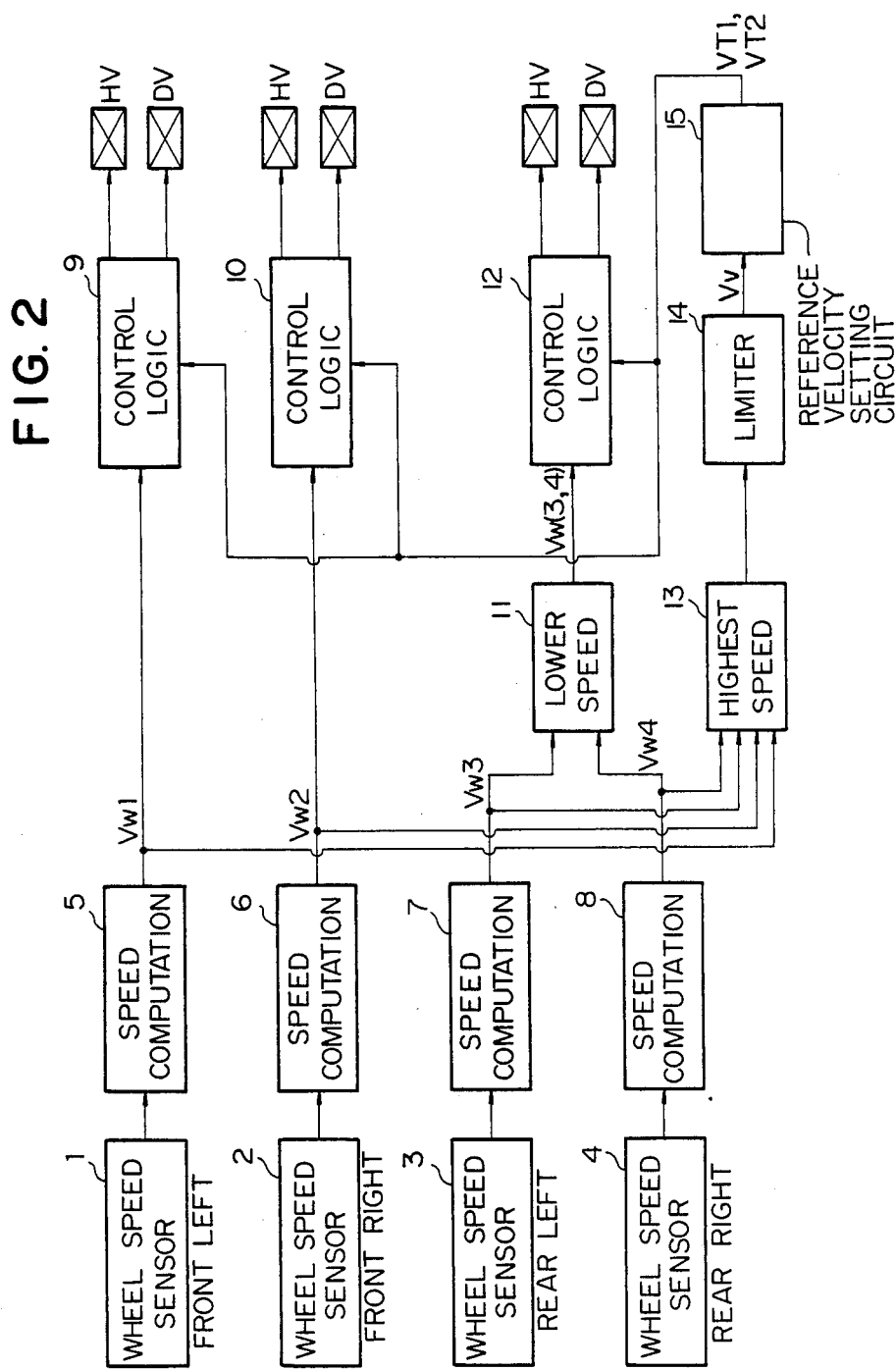
FIG. 2 is a block diagram showing the anti-skid control system according to an embodiment of the present invention.

Referring to FIG. 2 of the accompanying drawings, there is shown, in a block diagram, the anti-skid control system according to an embodiment of the present invention, which includes a front left wheel velocity sensor 1, a front right wheel velocity sensor 2, a rear left wheel velocity sensor 3, and a rear right wheel velocity sensor 4. Signals derived from the respective wheel velocity sensors 1 to 4 are transmitted to speed computation circuits 5 to 8 respectively so that wheel velocity signals Vw1 to Vw4 are computed; the front left and right wheel velocities Vw1 and Vw2 are inputted to control logic circuits 9 and 10 respectively, the rear left and right wheel velocities Vw3 and Vw4 are inputted to a selector circuit 11 so that the lower one of these two wheel velocities is selected (selection of the lower wheel velocity), and the selected lower wheel velocity, which is indicated by Vw(3.4) is inputted to a control logic circuit 12; and hold valves HV and decay valves DV are controlled by the control logic circuits 9, 10, and 12.

Figure 3:
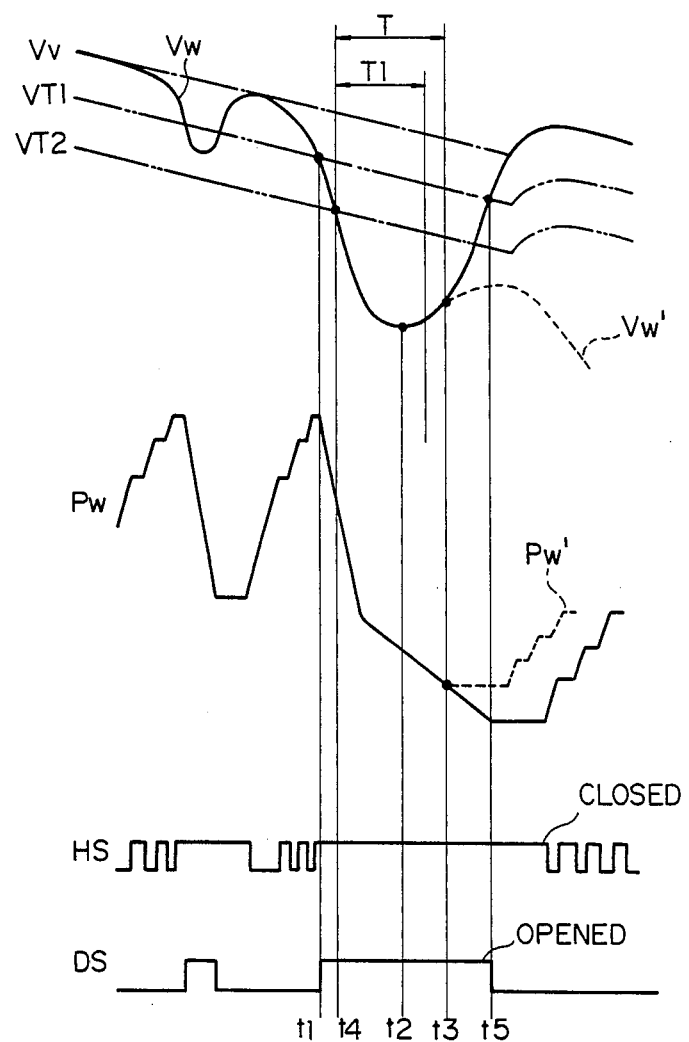
FIG. 3 is a view useful for explaining the operation of the present system.

Furthermore, the four wheel velocities Vw1 to Vw4 are also inputted to another selector circuit 13 so that the highest one of those four wheel velocities is selected (selection of the highest velocity); and the selected highest wheel velocity is passed through a limiter 14 which is so designed as to limit variations in the selected highest wheel velocity in the range of $+1G$ to $-1G$, so that a computed vehicle speed such as shown at Vv in FIG. 3 is set up on the basis of the highest wheel speed in such a manner that the computed wheel speed, which is approximate to the rear wheel speed, follows the highest wheel speed and the acceleration and deceleration thereof does not exceed $+1G$ and $-1G$ respectively. The computed vehicle velocity Vv is then passed to a reference velocity setting-up circuit 15 in which reference velocities VT1 and VT2 are set up in such a manner that these reference speeds VT1 and Vt2 are lower by 5km/h and 10km/h than Vv and follow the computed vehicle velocity Vv with such speed differences respectively. The output of the reference velocity setting-up circuit 15 is provided to the control logic circuits 9, 10, and 12. The reference velocity VT2 is set up such that under a normal road surface condition, the decreasing wheel speed Vw, which may be Vw1, Vw2, or Vw(3.4), does not fall below the level of the reference velocity VT2, while the reference velocity VT1 is so set as to be approximately intermediate the level of the computed vehicle velocity Vv and the level of the reference velocity VT2. In the respective control logic circuits 9, 10, 12, as in the prior art, the wheel velocity Vw is compared with the reference wheel velocity Vt so that reduction of the brake pressure Pw is started at time t1, and stopped either at time t2 when a low peak of the wheel velocity occurs or at time t3 when 15% recovery of the wheel velocity from the low peak occurs. In the case where the wheel velocity Vw becomes lower than the reference velocity VT2 during the reduction of the brake pressure Pw, the time period T from time t4 when the wheel velocity becomes equal to the reference velocity VT2 to the time t3 when the 15% recovery of the wheel velocity from the low peak occurs, is measured; if the measured time period T is longer than a predetermined time period T1 (150 ms, for example), the reduction of the brake pressure Pw is continued, instead of being stopped at the time t3; and the brake pressure Pw is reduced until time t5 when the wheel velocity Vw becomes equal to the reference velocity VT1, is reached (the reduction of the brake pressure Pw is stopped at the time t5). By virtue of the fact that the time period during which the brake pressure Pw is reduced, is extended, the wheel velocity Vw, even when reduced sharply because of the sudden change in the coefficient of friction of the road surface from high to low, quickly recovers without the wheels being subjected to early-locking. In FIG. 3, the broken lines represent the wheel velocity Vw' and brake pressure Pw' which occur when the reduction of the brake pressure is stopped at the time t3 as in the prior art. Even when the wheel velocity goes below the level of the reference velocity VT2, if the measured time period T is shorter than the predetermined time period T1, the reduction of the brake pressure will not be stopped either at the time t2 when a low peak of the wheel velocity occurs or at the time t3 when a 15% increase in the wheel velocity from the low peak occurs, so that the reduction of the brake pressure Pw will be continued.

Figure 4:
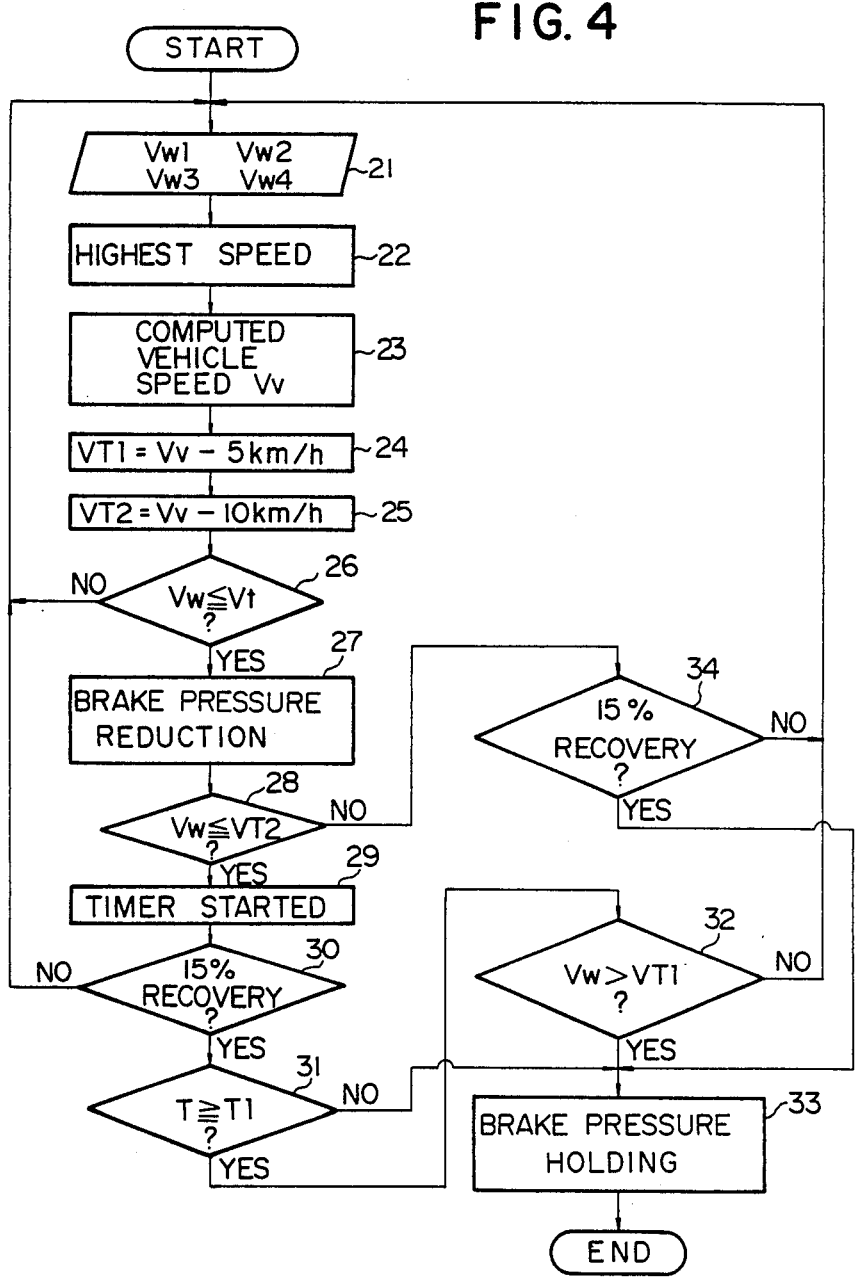
FIG. 4 is a flow chart useful for explaining the operation of the present system.

Referring to FIG. 4, there is shown a flow chart which illustrates the manner in which decay valves DV are controlled in accordance with the present invention. At step 21, the respective wheel velocities Vw1 to Vw4 are read in; at step 22, the highest one of the wheel velocities Vw1 to Vw4 is selected; and at step 23, the selected highest wheel velocity is passed through a limiter which is so designed as to limit variations in the selected highest wheel velocity to be in the range from $+1G$ to $-1G$, so that a computed vehicle velocity Vv is established. At step 24, a reference velocity VT1 ($=Vv-5km/h$) is set up on the basis of the computed vehicle velocity; and then at step 25, another reference velocity VT2 ($=Vv-10km/h$) is set up on the basis of the computed vehicle velocity Vv. Subsequently, at step 26, judgment is made as to whether the wheel velocity Vw becomes equal to a reference wheel velocity Vt; and if the result of the judgment is "YES", then at step 27, a decay signal DS is generated so that reduction of the brake pressure Pw is started at time t1. At step 28, judgment is made as to whether the wheel velocity Vw being reduced arrives at the reference velocity VT2; and if the result of the judgment is "YES", then at step 29, a timer is operated to start time measurement at time t4 when the wheel velocity Vw reaches the level of the reference velocity VT2. At step 30, judgment is made as to whether 15% recovery of the wheel velocity Vw from the low peak has occurred, i.e., as to whether time t3 when the reduction of the brake pressure is to be stopped has been reached; and if the result of the judgment is "YES", then at step 31, the time period T from the time t4 when the wheel velocity Vw has reached the level of the reference velocity VT2 to the time t3 when the reduction of the brake pressure is to be stopped, is compared with a predetermined time period T1 (150 ms, for example), and if T is longer than T1, the reduction of the brake pressure is continued. At step 32, judgment is made as to whether the wheel velocity Vw has increased up to the level of the reference velocity VT1; and at step 33, the decay signal is interrupted at time t5 when the result of judgment is "YES", so that the reduction of the brake pressure is stopped. When the result of the judgment at the step 28 "NO", i.e., when the wheel velocity Vw has not reached the level of the reference velocity VT2, judgment is made, at step 34, as to whether a 15% increase in the wheel velocity Vw from the low peak has occurred; and if the result of the judgment at the step 34 is "YES", then the step immediately advances to step 33 so that the reduction of the brake pressure is stopped. When the result of the judgment at the step 34 is "NO", i.e., when T is shorter than T1, too, the step advances to the step 33 so that the reduction of the brake pressure is stopped.

Although in the foregoing embodiment, the reference velocities VT1 and VT2 were related to the computed vehicle velocity Vv with predetermined velocity differences, it goes without saying that it is also possible that such reference velocities may be related to the computed vehicle velocity with predetermined ratios.

As will be appreciated from the above discussion, according to the present invention, when the time period T from the time t4 when the wheel velocity Vw being decreased reaches the level of the reference velocity VT2 to the time t3 of a low peak of the wheel velocity is shorter than the predetermined time period T1, the reduction of the brake, pressure is continued until time t5 when the wheel velocity Vw is increased up to the level of the reference velocity VT1. Therefore, even when sharply dropped because of the coefficient of friction of the road surface suddenly changing from high to low, i.e., because of the road surface representing a "jump" in $\mu$ (coefficient of friction), the wheel velocity is permitted to rapidly recover so that the wheels of the motor vehicle can be prevented from being subjected to early-locking.

While the present invention has been illustrated and described with respect to some specific embodiments thereof, it is to be understood that the present invention is by no means limited thereto but encompasses all changes and modifications which will become possible within the scope of the appended claims.

We claim:

1. An anti-skid control system for a motor vehicle, having a plurality of wheels and in which wheel velocity of the wheels is decreased by increasing brake pressure and is increased by reducing the brake pressure, and in which the reduction of the brake pressure is to be stopped at a point where a level of the wheel velocity is reached which is higher than a low peak of the wheel velocity by a predetermined percentage of difference between the wheel velocity at time when reduction of the brake pressure is started, and the low peak of the wheel velocity, comprising:

means for providing a computed vehicle velocity on the basis of the highest one of the wheel velocities of the motor vehicle;

means for providing a first reference velocity and a second reference velocity, each of said reference velocities being lower than said computed vehicle velocity, said first and second reference velocities respectively having a first and a second velocity different, or a first and a second velocity ratio, with respect to said computed vehicle velocity; said first reference velocity being higher than said second reference velocity; and means for continuing reducing the brake pressure beyond said point until the wheel velocity recovers up to said first reference velocity, if the time period from when the wheel velocity reaches said second reference velocity to said point where said level of the wheel velocity is reached, is longer than a predetermined time period.

2. The system according to claim 1, wherein said means for providing the computed vehicle velocity includes means for limiting variations in the highest wheel velocity to be in the range from $-1G$ to $+1G$, where G being the unit of force exerted by gravity.

3. The system according to claim 1, wherein said first and second reference velocities are lower by 5km/h and 10km/h respectively than the computed vehicle velocity.

4. The system according to claim 1, wherein said predetermined time period is 150 ms.

* * * * *